(12) United States Patent
Pietruska et al.

(10) Patent No.: US 6,503,349 B2
(45) Date of Patent: Jan. 7, 2003

(54) REPAIR OF SINGLE CRYSTAL NICKEL BASED SUPERALLOY ARTICLE

(75) Inventors: Norman Pietruska, Durham, CT (US); David J. Kline, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/855,352

(22) Filed: May 15, 2001

(65) Prior Publication Data

US 2002/0185198 A1 Dec. 12, 2002

(51) Int. Cl.$^7$ ................................................ B23K 31/02
(52) U.S. Cl. ........................ 148/562; 148/675; 228/119; 228/233.2
(58) Field of Search ................................ 148/528, 562, 148/675; 75/255; 228/119, 233.2

(56) References Cited

U.S. PATENT DOCUMENTS

| | | | | |
|---|---|---|---|---|
| 4,478,638 A | * | 10/1984 | Smith et al. | .................. 75/255 |
| 4,830,934 A | * | 5/1989 | Ferrigno et al. | ............... 75/255 |
| 4,910,098 A | * | 3/1990 | Lee et al. | ...................... 75/255 |
| 5,523,170 A | * | 6/1996 | Budinger et al. | ............. 75/255 |
| 5,549,767 A | | 8/1996 | Pietruska et al. | |
| 5,741,378 A | | 4/1998 | Pietruska et al. | |
| 5,916,518 A | * | 6/1999 | Chesnes | ................ 228/262.31 |
| 5,922,150 A | | 7/1999 | Pietruska et al. | |

* cited by examiner

*Primary Examiner*—George Wyszomierski
(74) *Attorney, Agent, or Firm*—Bachman & LaPointe, P.C.

(57) ABSTRACT

The present invention relates to a method for repairing components formed from a single crystal nickel based superalloy. The method comprises the steps of applying a repair alloy to at least one portion of a component formed from the single crystal nickel based superalloy and heating the component with the repair alloy thereon to a temperature that avoids recrystallization and repair zone incipient melting of the single crystal nickel based superalloy. Following the heating step, the component is preferably rapidly cooled and subjected to an aging treatment.

14 Claims, 2 Drawing Sheets

REPAIR OF SINGLE CRYSTAL NICKEL BASED SUPERALLOY ARTICLE

BACKGROUND OF THE INVENTION

The present invention relates to a method of repairing single crystal nickel base superalloy components such that mechanical property degradations are minimized and repair joint strength is maximized.

Superalloys are used for various components in gas turbine engines where the components are exposed to high temperatures and pressures for extended periods of time. A typical application is high pressure turbine vanes, where the temperature of the component can rise to about 2000° F. Under these conditions, the component is expected to retain its shape and strength long enough to provide economical operation of the engine without unduly frequent service or replacement requirements.

Typically, superalloy components have been produced by precision casting, which provides a near-net shape component requiring only minimal machining operations to reach final configuration. To provide additional protection for the material from the high temperatures and corrosive environment due to combustion processes, a protective coating is commonly applied. Components with adequate properties for the desired applications have been successfully produced with no heat treatment other than the heating cycle incurred as part of the coating process, which is effectively a precipitation heat treatment of the as-cast material.

After extended service, some of these components incur damage, due to erosion, thermal mechanical fatigue-induced cracking caused by the frequent cycling between ambient and operating temperatures, or creep, which causes the airfoil portions of the components to bow or the platform portions of the component to twist away from their original positions, with a resultant change in the operational characteristics of the components. A number of methods for repairing these components have been developed and used.

One such repair method is illustrated in U.S. Pat. Nos. 5,549,767 and 5,922,150, both to Pietruska et al. This method for repairing cobalt-based superalloy gas turbine engine components comprises applying a mixture of a base alloy powder and a base alloy powder with a melting point depressant to the surface of the component and heating at a temperature in the range of 2250° F. to 2300° F. to diffuse the melting point depressant isothermally into the base alloy. A protective coating is then applied, during which a heating cycle which ages the base material is used.

U.S. Pat. No. 5,741,378 to Pietruska et al. illustrates a method for restoring the mechanical properties of carbide-containing cobalt-based superalloy gas turbine engine components. The method includes solution heat treating to a temperature in the range of 2250° F. to 2300° F. for one to twelve hours to dissolve complex carbides and aging at approximately 1965° F. to 1975° F. for two to twenty four hours.

Braze-type repairs to non-single crystal nickel base superalloy components used in gas turbine engines are typically accomplished using a heat treatment method that re-solutions the alloy to assure no mechanical property debits. At the same time, this heat treatment assures maximum diffusion of the repair zone without any incipient melting in the repair zone or the base alloy. This method is effective for non-single crystal nickel based superalloys; however, for single crystal nickel based superalloys, this method results in significant recrystallization that greatly reduces fatigue properties and also results in an overdiffused repair zone with local areas of melting.

Thus, there remains a need for an effective method for repairing components formed from single crystal nickel based superalloys.

SUMMARY OF THE INVENTION

Accordingly, it is an object of the present invention to provide an improved method for repairing single crystal nickel based superalloy components so as to minimize mechanical property degradations.

It is a further object of the present invention to provide a method as above which maximizes joint strength.

The foregoing objects are attained by the method of the present invention.

In accordance with the present invention, a method for repairing components formed from a single crystal nickel based superalloy broadly comprises applying a repair alloy to a single crystal nickel based superalloy component to be repaired and heating said component and said applied repair alloy to a temperature that avoids recrystallization and repair zone incipient melting of the single crystal nickel based superalloy. In a first embodiment of the method of the present invention, the heating step comprises heat treating the component and the applied repair alloy at a temperature in the range of from about 2150° F. to about 2275° F., preferably about 2200° F., for a time period in the range of from about 5 hours to 24 hours, preferably about 10 hours. Following heating, the component is rapidly cooled and subjected to an aging treatment.

In a second embodiment of the present invention, the heating step comprises heating the component and the applied repair alloy to a temperature in the range of from about 2250° F. to about 2350° F., preferably about 2300° F., holding the component and the applied repair alloy at this temperature for a time in the range of less than about 30 minutes, preferably 15 minutes or less, rapidly cooling the component and the applied repair alloy to a temperature in the range of from about 1950° F. to about 2075° F., preferably about 2025° F., and holding the component and the applied repair alloy at this temperature for a time in the range of from about 5 hours to about 24 hours, preferably about 10 hours. Following this heat treatment, the component is rapidly cooled and subjected to an aging treatment.

Other details of the repair method of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
FIG. 1 is a photomicrograph showing a repaired crack in the buttress portion of a component.

The use of single crystal nickel based superalloys for certain applications in a gas turbine engine, such as for the first and second stage high pressure turbine (HPT) vanes, is highly desirable because the material has good mechanical properties and a significant resistance to the corrosive environment inherently related to the combustion process occurring in the engine. However, the operating conditions are sufficiently severe that the material requires additional protection, in the form of a protective coating, to provide the service lifetime required.

The coating which is applied to the components such as the vanes is typically of the MCrAlY type, where M is selected from the group consisting of iron, nickel, cobalt, and certain mixtures thereof, or of the diffusion aluminide type. A typical application of the coating includes steps of applying the coating material to the surface of the component, either in the as-cast state or with a previously applied solution heat treatment, and heating for either four hours at about 1965° F. for the MCrAlY type coating or for 24 hours for the diffusion aluminide type coating to diffusing the coating layer into the substrate material.

After a significant lifetime, these components frequently experience detrimental effects, typically in the form of erosion, thermal mechanical fatigue-induced cracking due to the temperature cycling encountered in normal operation of an engine, or creep due to the extended exposure time at elevated temperatures.

The process for repairing these worn components comprises adding a repair material such as a repair alloy to rebuild the eroded areas of the component, or to fill in the cracks formed as discussed above. Prior to adding the repair material, all detail pieces such as baffles, covers, etc. are removed. The component may be grit blasted and/or cleaned, typically in a hydrogen fluoride atmosphere, to remove oxides.

After cleaning, the repair material is added in the form of a powder, a tape, a paint, or a paste. The repair material preferably comprises a blend of two nickel based alloys—the first being a low melting temperature nickel based brazing alloy and the second being a high melting temperature nickel based alloy. In a first repair alloy blend, the first nickel based alloy is present in a range of 49–51 wt % and the second nickel based alloy is present in a range of 49–51 wt %. In a second repair alloy blend, the first alloy is present in a range of 39–41 wt % and the second alloy is present in a range of 59–61 wt %. In a third repair alloy blend, the first alloy is present in a range of 29–31 wt % and the second alloy is present in a range of 69–71 wt %. In a fourth repair alloy blend, the first alloy is present in a range of 19–21 wt % and the second alloy is present in a range of 79–81 wt %.

The first nickel based brazing alloy in the repair alloy blend preferably contains from about 8.5 to 9.5 wt % chromium, from about 7.5 to 8.5 wt % cobalt, from about 3.75 to 4.25 wt % tungsten, from about 1.75 to 2.25 wt % aluminum, from about 2.75 to 3.25 wt % boron, from about 0.75 to 1.25wt % hafnium, up to about 0.015 wt % carbon, up to about 0.10 wt % manganese, up to about 0.10 wt % silicon, up to about 0.015 wt % phosphorous, up to about 0.015 wt % sulfur, up to about 0.10 wt % iron, up to about 0.05 wt % copper, up to about 0.20 wt % zirconium, and the balance nickel and inevitable impurities. The second nickel based alloy used in the repair alloy blend is preferably a nickel based alloy containing from about 4.75 to 5.25 wt % chromium, from about 9.5 to 10.5 wt % cobalt, from about 1.7 to 2.1 wt % molybdenum, from about 8.4 to 9.0 wt % tantalum, from about 5.6 to 6.2 wt % tungsten, from about 2.8 to 3.2 wt % rhenium, from about 5.5 to 5.8 wt % aluminum, from about 0.05 to 0.15 wt % hafnium, up to about 0.050 wt % carbon, up to about 0.12 wt % manganese, up to about 0.12 wt % silicon, up to about 0.015 wt % phosphorous, up to about 0.015 wt % sulfur, up to about 0.003 wt % boron, up to about 0.20 wt % iron, up to about 0.10 wt % copper, up to about 0.0075 wt % zirconium, and the balance nickel and inevitable impurities.

In another embodiment of the present invention, the aforementioned second nickel based alloy in the repair alloy blend is replaced by a nickel based alloy containing grain boundary strengtheners. Suitable alloys include the following: (1) an alloy having a composition comprising from about 4.75 to 5.25 wt % chromium, from about 9.5 to 10.5 wt % cobalt, from about 1.7 to 2.1 wt % molybdenum, from about 5.6 to 6.2 wt % tungsten, from about 2.8 to 3.2 wt % rhenium, from about 7.8 to 9.0 wt % tantalum, from about 5.5 to 5.8 wt % aluminum, from about 0.25 to 0.45 wt % hafnium, from about 0.003 to 0.040 yttrium, up to about 0.050 wt % carbon, up to about 0.12 wt % manganese, up to about 0.12 wt % silicon, up to about 0.015 wt % phosphorous, up to about 0.015 wt % sulfur, up to about 0.0030 wt % boron, up to about 0.20 wt % iron, up to about 0.10 wt % copper, up to about 0.03 wt % zirconium, and the balance nickel and inevitable impurities; (2) an alloy having a composition comprising from about 9.5 to 10.5 wt % chromium, from about 4.5 to 5.5 wt % cobalt, from about 3.75 to 4.25 wt % tungsten, from about 1.25 to 1.75 wt % titanium, from about 11.75 to 12.25 wt % tantalum, from about 4.75 to 5.25 wt % aluminum, from about 0.003 to 0.40 wt % yttrium, from about 0.25 to 0.45 wt % hafnium, up to about 0.05 wt % carbon, up to about 0.12 wt % manganese, up to about 0.12 wt % silicon, up to about 0.015 wt % phosphorous, up to about 0.015 wt % sulfur, up to about 0.0030 wt % boron, up to about 0.2 wt % iron, up to about 0.10 wt % copper, up to about 0.03 wt % zirconium, and the balance nickel and inevitable impurities; and (3) an alloy containing from about 9.5 to 10.5 wt % chromium, from about 4.5 to 5.5 wt % cobalt, from about 3.75 to 4.25 wt % tungsten, from about 1.25 to 1.75 wt % titanium, from about 11.75 to 12.25 wt % tantalum, from about 4.75 to 5.25 wt % aluminum, up to about 0.05 wt % carbon, up to about 0.12 wt % silicon, up to about 0.12 wt % manganese, up to about 0.015 wt % sulfur, up to about 0.015 wt % phosphorous, up to about 0.20 wt % iron, up to about 0.10 wt % copper, and the balance nickel and inevitable impurities.

Following the application of the repair alloy, the component formed from the single crystal nickel base alloy and the repair alloy thereon are heated to a temperature that avoids recrystallization and repair zone incipient melting of the single crystal nickel base superalloy forming the component being repaired. In a first embodiment of the present invention, the component with the repair material thereon is heat treated to achieve wide gap isothermal solidification in the repair joint. In this approach, the component is heated to a temperature in the range of from about 2150° F. to about 2275° F., preferably about 2200° F., for a time period in the range of from about 5 hours to 24 hours, preferably about 10 hours. Following the heat treatment, the component and the repair material are rapidly cooled at a first rate of 115° F./min. or faster to a temperature of 2100° F. and thereafter at a second rate of 35° F./min. or faster to a temperature of 800° F. Following cooling, the component and the repair material thereon are subjected to a re-aging treatment at a temperature in the range of from about 1300° F. to about 1600° F. for a time in the range of from about 12 hours to 36 hours in any suitable atmosphere such as air.

In some situations, it may be desirable to perform a preliminary heat treatment before the re-aging heat treatment. The preliminary heat treatment may be carried out at a temperature in the range of from about 1950° F. to 2000° F. for about 4 hours in a protective atmosphere such as argon.

It has been found that the blended nickel alloy repair material described hereinbefore is a compatible alloy for the heat treatment of the present invention. It also has been found that a blend or mixture of the first nickel based repair alloy and certain ones of the second nickel based alloys as the base alloy constituent further strengthens the repair joint by providing grain boundary strengtheners to the repair material. This first heat treatment approach reduces lower temperature creep strength, but high temperature creep, low temperature tensile strength, and low cycle fatigue are relatively unaffected. The lower creep strength is acceptable for most applications because the starting creep strength for this family of nickel based alloys is far beyond the strength the component requires.

In a second approach, the single crystal nickel based alloy component to be repaired is first grit blasted and/or cleaned as described above. Following application of a suitable repair material, either in powder, tape, paint or paste form, to the single crystal nickel based alloy component to be repaired, the component with the repair material thereon is heated to a thermal spike temperature in the range of from about 2250° F. to 2350° F., preferably about 2300° F., followed by a rapid cool at a cooling rate of from about 5° F. to 100° F. per minute, preferably about 35° F. per minute, to a temperature in the range of from about 1950° F. to 2075° F., preferably about 2025° F. The component is held at the spike temperature for a minimum time sufficient to heat the component. Preferably, the component is held at the spike temperature for a period of about 30 minutes or less and most preferably for about 15 minutes or less. The component is held at the lower temperature range for a time period in the range of from about 5 hours to 24 hours, preferably about 10 hours.

Following this heat treating cycle, the component is subjected to a rapid cool at a cooling rate of about 35° F./min. or faster. Thereafter, the component is subjected to a re-aging treatment at a temperature in the range of from about 1300° F. to 1600° F. for a time in the range of from about 12 hours to 36 hours in a suitable atmosphere.

In this second approach, the repair material preferably comprises a blend of alloys having the weight percentages discussed above. The second nickel base alloys discussed in connection with the first approach described herein can be used as one of the alloys in the repair material blend. Instead of using the first nickel base alloy described above in connection with the blend used in the first approach, it is preferred to use other high temperature nickel or cobalt based braze alloys, such as AMS 4783 or CO 333, as the first alloy in the repair material blend.

This second approach has limited adversative affects on the base alloy mechanical properties and likely results in a higher remelt temperature for the braze alloy. The gap width capability with this approach is somewhat reduced as compared to the first approach discussed herein.

A summary of the mechanical property effects for the two approaches are shown in Table I where 1X represents the baseline.

TABLE I

| Property | 2200° F. TURBOFIX ® | 2350° F. TURBOFIX ® |
| --- | --- | --- |
| 1200° F. Tensile UTS | .97X | .83X |
| 1600° F./25 ksi 2% Creep Life | .44X | .85X |
| 1900° F./25 ksi 2% Creep Life | .83X | .91X |
| 1200° F. LCF Life | .97X | .83X |

Figure 2:
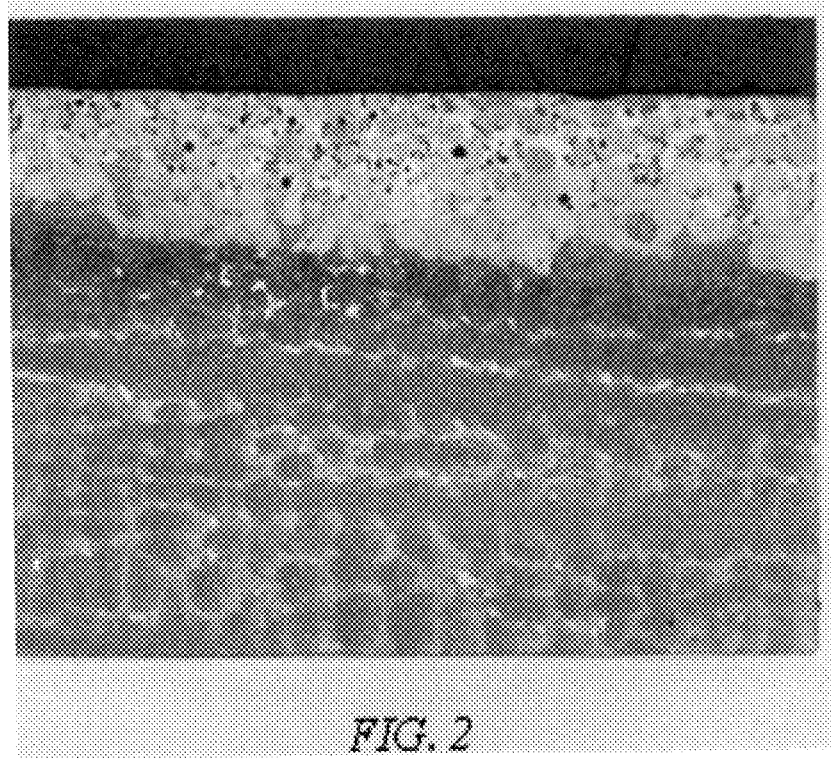
FIG. 2 is a photomicrograph showing the repair of an eroded surface with a build-up of approximately 0.016 inches.
Figure 3:
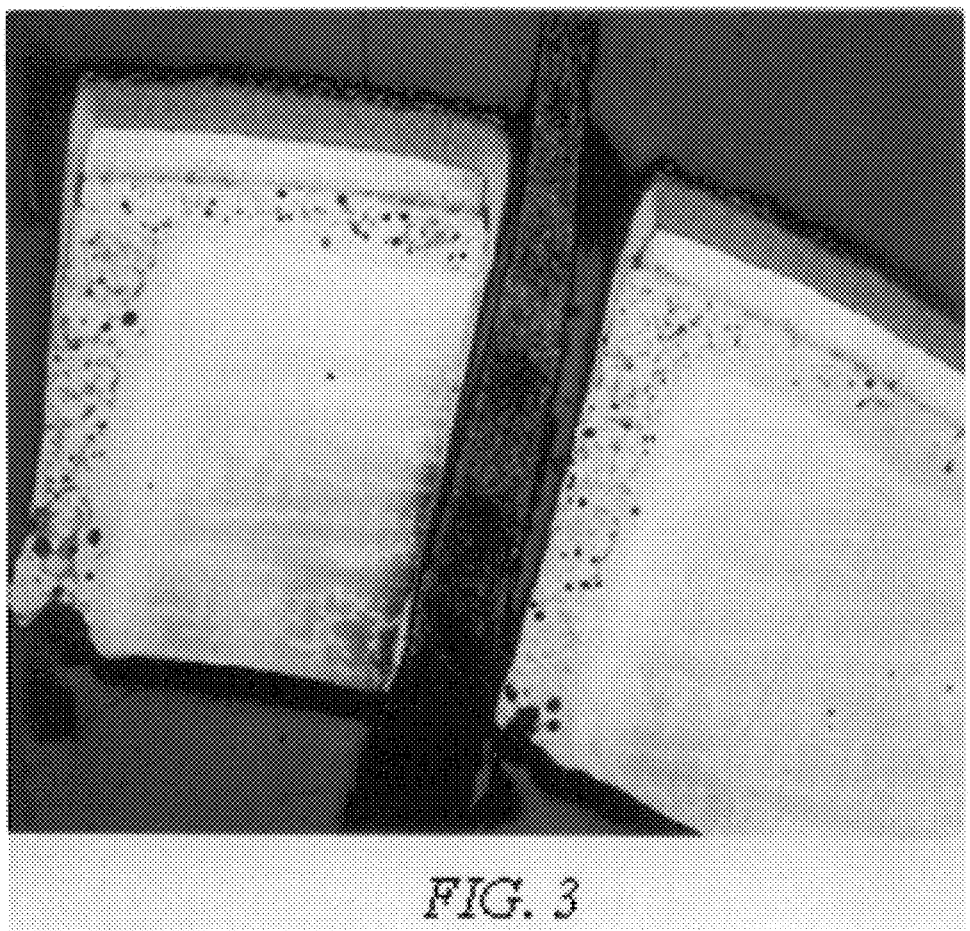
FIG. 3 is a photomicrograph of a leading edge cooling hole after engine test showing that the surrounding coating and repair material are fully intact.

FIG. 1 shows a crack repair using the first approach described herein. The crack has all oxides removed and has been fully filled with the repair material. The repair material has isothermally solidified without creating any adverse excessive diffusion or incipient melting. FIG. 2 shows a 0.016 inch thick surface buildup repair using the first approach described herein. The repair shows a microstructure of base alloy particles surrounded by repair alloy. There is no incipient melting of the substrate, and there is isothermal solidification along the interface and into the buildup. FIG. 3 shows cooling holes that are filled with the repair alloy using the first approach described herein and then redrilled in an area adjacent region. A ceramic coating with a MCrAlY bond coat is applied on the external surface. The repair alloy shows a nearly complete isothermal solidification and no incipient melting in the adjoining substrate. All of the samples shown in these figures show no adverse anomalies associated with the testing.

It is apparent that there has been provided in accordance with the present invention a method for repairing components formed from a single crystal nickel based superalloy which fully satisfies the objects, means and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. A method for repairing components formed from a single crystal nickel based superalloy comprising the steps of:
   applying a repair alloy to at least one portion of a component formed from a single crystal nickel based superalloy to be repaired;
   heating the component with said repair alloy to a temperature that avoids recrystallization and repair zone incipient melting of said single crystal nickel based superalloy; and
   said heating step comprising heating the component with said repair alloy at a temperature in the range of from about 2150° F. to 2275° F. for a time period in the range of from about 5 hours to about 24 hours.

2. A method according to claim 1, further comprising rapidly cooling said component following said heating step and subjecting said cooled component to an aging treatment.

3. A method according to claim 1, wherein said heating step comprises heating the component with said repair alloy to a temperature of about 2200° F. for about 10 hours.

4. A method according to claim 1, further comprising rapidly cooling said heated component and repair alloy at a rate of 115° F. or faster to a temperature of 2100° F. and then at a rate of 35° F. or faster to a temperature of 800° F. and aging said cooled component at a temperature in the range of from about 1300° F. to 1600° F. for a time period in the range of from about 12 hours to 36 hours.

5. A method according to claim 1, wherein said repair alloy applying step comprises applying a blend of nickel based alloys to said component.

6. A method according to claim 5, wherein said repair alloy applying step comprises applying a repair alloy blend having from about 49–51 wt % of a low melting temperature nickel based braze alloy and from about 49–51 wt % of a high melting temperature nickel based alloy.

7. A method according to claim 5, wherein said repair alloy applying step comprises applying a repair alloy blend having from about 39–41 wt % of a low melting temperature nickel based braze alloy and from about 59 to 61 wt % of a high temperature melting nickel based alloy.

8. A method according to claim 5, wherein said repair alloy applying step comprises applying a repair alloy blend having from about 29–31 wt % of a low melting temperature nickel based braze alloy and from about 69 to 71 wt % of a high melting temperature nickel based alloy.

9. A method according to claim 5, wherein said repair alloy applying step comprises applying a repair alloy blend having from about 19–21 wt % of a low melting temperature nickel based braze alloy and from about 79 to 81 wt % of a high melting temperature nickel based alloy.

10. A method for repairing components formed from a single crystal nickel based superalloy comprising the steps of:

applying a repair alloy to at least one portion of a component formed from a single crystal nickel based superalloy to be repaired;

heating the component with said repair alloy to a temperature that avoids recrystallization and repair zone incipient melting of said single crystal nickel based superalloy; and said heating step comprising heating said component and said repair alloy to a first temperature in the range of from about 2250° F. to 2350° F., holding said component and said repair alloy at said first temperature for a time of 30 minutes or less, cooling said component and said repair alloy to a second temperature in the range of from about 1950° F. to 2075° F. and holding said component and said repair alloy at said second temperature for a time in the range of from about 5 hours to 24 hours.

11. A method according to claim 10, further comprising cooling said component and said repair alloy from said first temperature to said second temperature at a rate of 5° F. to 100° F. per minute.

12. A method according to claim 10, further comprising additionally cooling said component and said repair alloy at a rate of 35° F. per minute or faster and aging said component and said repair alloy at a temperature in the range of from about 1300° F. to 1600° F. for a time in the range of from about 12 hours to 36 hours following said additional cooling step.

13. A method according to claim 10 wherein said repair alloy applying step comprises applying a repair alloy blend containing a base alloy formed from a nickel based alloy and a braze alloy selected from the group consisting of high temperature cobalt based braze alloys and high temperature nickel based braze alloys.

14. A method for repairing components formed from a single crystal nickel based superalloy comprising the steps of:

applying a repair alloy to at least one portion of a component formed from a single crystal nickel based superalloy to be repaired;

heating the component with said repair alloy to a temperature that avoids recrystallization and repair zone incipient melting of said single crystal nickel based superalloy; and said heating step comprising heating the component and the repair alloy to a first temperature of 2300° F., holding the component and the repair alloy at said first temperature for a time period of 15 minutes or less, cooling the component and the repair alloy at a rate of 35° F. per minute to a second temperature of 2025° F., and holding the component and the repair alloy at said second temperature for about 10 hours.

* * * * *